NON-LINEAR, POSITIVE-FEEDBACK AMPLIFIER

Filed April 21, 1965

INVENTOR
Ryoichi Abe
Takeo Miura
BY
H. Edward Mostern

United States Patent Office 3,423,687
Patented Jan. 21, 1969

3,423,687

NON-LINEAR, POSITIVE-FEEDBACK AMPLIFIER

Ryoichi Abe, Kodaira-shi, Tokyo-to, and Takeo Miura, Kokubunji-shi, Tokyo-to, Japan, assignors to Kabushiki Kaisha Hitachi Seisakusho, Chiyoda-ku, Tokyo-to, Japan, a joint-stock company of Japan Continuation-in-part of application Ser. No. 244,640, Dec. 14, 1962. This application Apr. 21, 1965, Ser. No. 449,742
Claims priority, application Japan, Dec. 16, 1961, 36/45,692
U.S. Cl. 330—8 4 Claims
Int. Cl. H03f 9/00

ABSTRACT OF THE DISCLOSURE

Two regenerative feedback paths, one linear and one non-linear, extend from a common output terminal of a magnetic amplifier to the input thereof, the non-linear path including two Zener diodes connected back-to-back whereby, upon the breakdown of the reverse-connected Zener diode in the presence of a high output voltage, the forwardly connected Zener diode acts as a non-linear resistance to introduce a corrective positive feedback designed to compensate for deviations from linearity.

This application is a continuation-in-part of our prior application Ser. No. 244,640 filed Dec. 14, 1962, now abandoned.

This invention relates to improvements in the linearity of the input-output characteristics of such amplifiers as magnetic amplifiers and rotary-machine-type amplifiers, and, more particularly, to a new non-linear, positive-feedback amplifier of improved quality.

In many cases, magnetic and other amplifiers are required to have linear input-output characteristics over a wide range. In general, however, the output does not linearly follow the input on the high-voltage end of the input-signal range and has the tendency of dropping, because of saturation, below the values corresponding to a linear characteristic. This saturation phenomenon is pronounced particularly in an amplifier wherein an iron core is used, such as a self-saturating magnetic amplifier.

It is an object of the present invention to eliminate the above-mentioned adverse effect due to saturation on the linearity of the amplifier gain. Broadly stated, the invention contemplates achieving this object by applying a non-linear positive feedback of a magnitude corresponding to that necessary for correcting the progressive decrease in the amplification gain when the output of the amplifier reaches a saturation state.

The nature, principle, and details of the invention will be more clearly apparent by reference to the following detailed description taken in conjunction with the accompanying drawing, in which like parts are designated by like reference numerals, and in which.

Figure 1:
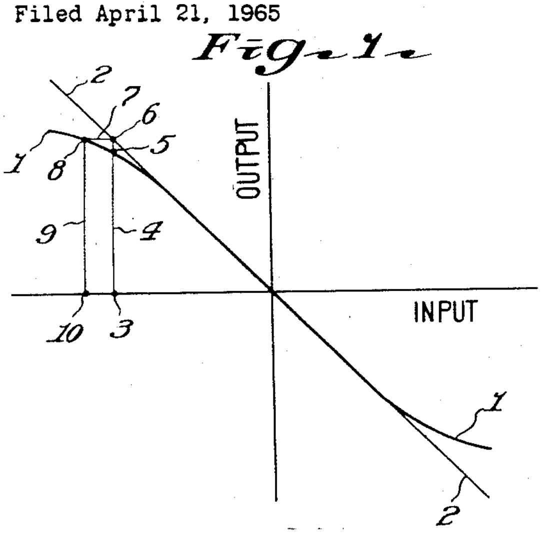
FIG. 1 is a graphical representation showing the input-output characteristic of a magnetic amplifier.

In general, a relationship as indicated by the curve 1 in FIG. 1 exists between the input and output of a magnetic amplifier. The reference numeral 2 designates the input-output characteristics of an ideal amplifier. For an amplifier having the characteristic indicated by curve 1, the present invention seeks to correct the input-output characteristic thereof to that represented by curve 2 by applying non-linear positive feedback, obtained in the manner described hereinbelow, to the input side of the amplifier.

In FIG. 1, a line 4 parallel to the output axis is drawn through an arbitrary input value 3, and the intersections of this line 4 with the characteristic curves 1 and 2 are respectively designated by reference numerals 5 and 6. Next, a line 7 parallel to the input axis is drawn from the intersection 6, and the intersection of this line 7 with the curve 1 is designated 8. From the intersection 8, a vertical line 9 perpendicular to the input axis is drawn with the intersection of this vertical line 9 and the input axis is designated 10. Then, the quantity corresponding to the distance between the points 3 and 10 on the input axis is the magnitude of corrective positive-feedback necessary to shift the point 5 to the point 6.

Figure 2:
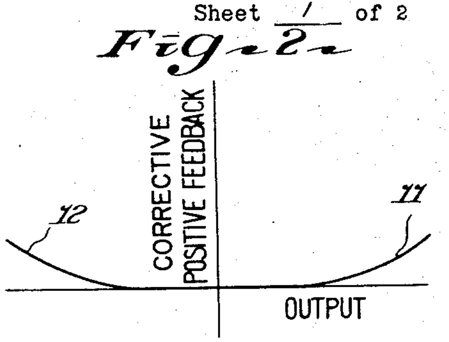
FIG. 2 is a graphical representation showing the relation between non-linear positive feedback and output.

FIG. 2 indicates the relationship between the corrective positive-feedback quantity, obtained by the above-described method, and the output. The parts 11 and 12 of the curve represent the positive-feedback quantities with respect to positive and negative values of the output of the amplifier. From this curve it will be apparent that, as the amplifier output increases, the corrective positive-feedback quantity increases non-linearly.

Figure 3:
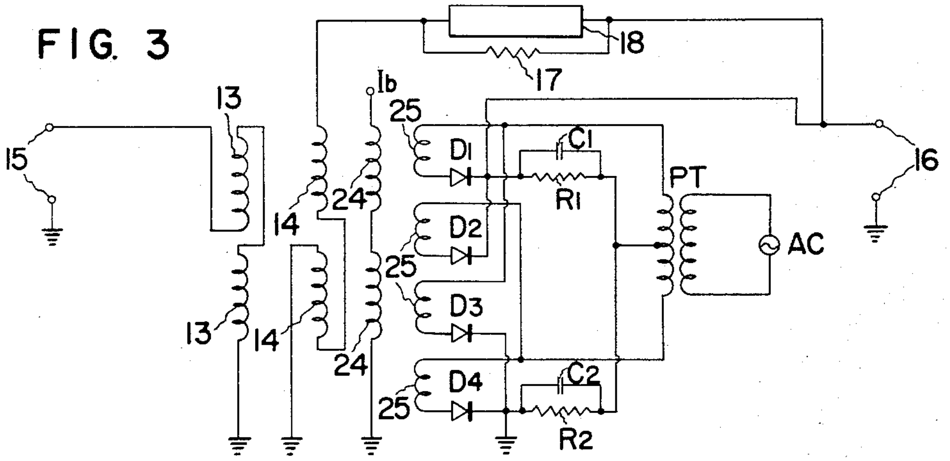
FIG. 3 is one embodiment of an electrical circuit arrangement of the non-linear, positive-feedback magnetic amplifier according to this invention.

Such a non-linear positive-feedback quantity can be applied to the feedback winding of the amplifier by inserting, for example, a non-linear semiconductor element in a positive-feedback circuit between the said feedback winding and the output. Such an embodiment of the magnetic amplifier according to this invention, which is adapted to apply the aforesaid, corrective non-linear positive-feedback quantity to the input side by use of a non-linear element, is illustrated in FIG. 3. This amplifier comprises, essentially, input windings 13, feedback windings 14, input terminals 15, output terminals 16, for energizing a load not shown, an ordinary linear positive-feedback circuit 17, a non-linear positive-feedback circuit 18 according to the present invention, bias windings 24 which can be excited by a biasing current $I_b$, output windings 25 from which amplified output signals can be derived, diodes $D_1$–$D_4$, capacitors $C_1$, $C_2$, resistors $R_1$, $R_2$, a power transformer PT, and an a.c. power source AC. The abovementioned input windings 13 and the freedback windings 4 are so wound that the magnetic flux of the respective windings are additively combined, and the amplifier is so constructed that a part of the output thereof can be regeneratively fed back to the abovementioned feedback windings 14, as shown in FIG. 2, by the linear positive-feedback circuit 17 and the non-linear positive-feedback circuit 18. In this amplifier circuit, when the input and output are within their low ranges and the resistance of the non-linear feedback circuit 18 is very great, the input-output characteristic is linear as is apparent from the graph of FIG. 1. Thus the output is positively fed back to the feedback windings 14 mainly through the linear positive-feedback circuit 17. When the input increases to a point in the range exceeding the point of parting of the curves 1 and 2 in FIG. 1, the resistance of the non-linear feedback circuit 18 is induced by the output voltage. At this time, therefore, the output signal is also regeneratively fed back to the feedback windings 14 through the non-linear positive feedback circuit 18. For this reason, the positive-feedback quantity increases and causes the amplifier output to increase, whereby the input-output characteristic of the amplifier is caused to approach the linear form indicated by the curve 2 in FIG. 1.

The non-linear feedback circuit which is of great importance in the present invention is formed from, for example, one semiconductor Zener diode or a combination of a plurality of semiconductor diodes used as a non-linear impedance. In the case of a self-saturating magnetic amplifier, since the input and output powers are, respectively, obtained in the form of a current and a voltage, such a device as a variator for spark quenching may be used in addition to the above-mentioned semiconductor device as part of the non-linear impedance.

Figure 4:
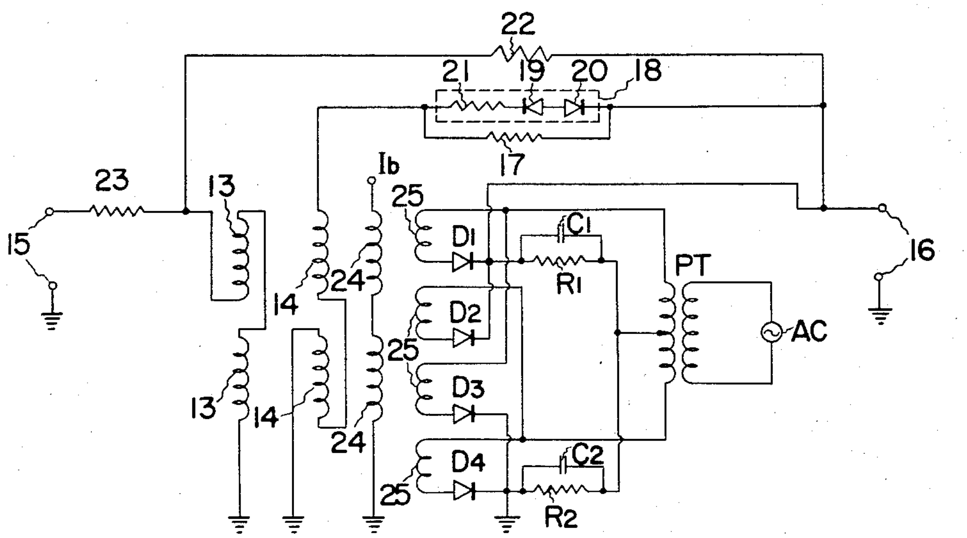
FIG. 4 is a circuit diagram of another magnetic amplifier embodying the invention.

The circuit arrangement of a similar magnetic amplifier embodying this invention is shown in FIG. 4. In this embodiment, the non-linear positive-feedback circuit 18 is formed from two diodes 19 and 20 connected back-to-back in series with a resistance 21, impedance elements being shunted by linear resistance 17. The diodes 19 and 20 may be of the Zener type. A Zener diode acts as a normal rectifier in that it provides a low-impedance path in one direction and a high-impedance path in the opposite direction. However, the high-impedance path can only be maintained as long as the applied voltage is lower than a specific value, called the Zener voltage. When the applied back voltage exceeds the Zener voltage, a Zener diode also conducts in the reverse direction. Therefore, with two Zener diodes connected in series with opposite polarities, the combination will become an open circuit for low voltage and will provide a low-impedance path for high voltage. Thus, as mentioned above, when the amplifier output attains a high voltage, a decrease in the resistance of the non-linear positive circuit 18 increases the gain of the amplifier. In addition to the parts previously mentioned in connection with the circuit shown in FIG. 3, the circuit of FIG. 4 is further provided with a degenerative feedback impedance 22 and an input impedance 23. In this circuit, a part of the output is negatively fed back to the input windings 13 through the feedback impedance 22. The other portions are the same as in the embodiment of FIG. 3.

Thus, as soon as the output voltage on the ungrounded load terminal 16, rising substantially in proportion to the magnitude of a control signal applied to input 15, reaches the terminal region of the operating range in which its magnitude is sufficient to break down the reverse-connected Zener diode 20, the forwardly connected diode 19 acts as a non-linear resistance supplying the necessary amount of corrective feedback to the input of the amplifier by way of windings 14.

Figure 5:
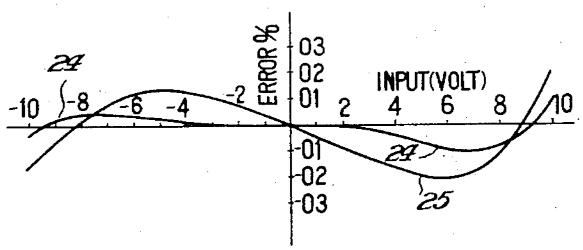
FIG. 5 is a graphical representation showing characteristic curves indicating the relationship between input voltage and error for the general case of positive feedback and for the case of the present invention.

FIG. 5 shows characteristic curves indicating the variations of the deviation from linearity with input voltage, curve 24 being the error curve of an amplifier according to the present invention as illustrated in FIG. 4, and curve 25 being the error curve in the case of a general linear positive feedback as would exist in the circuit of FIG. 4 if the linear positive-feedback circuit 18 were removed. It will be apparent from FIG. 5 that the saturation-prone amplifier of the present invention provided with a non-linear, positive-feedback circuit 18 has less error than an ordinary amplifier of similar type.

Thus, our invention, extends the input-output linear range of an amplifier with saturation characteristic, increases the accuracy of the amplifier, and, at the same time, broadens the range of its usefulness.

Although this invention has been described with respect to particular embodiments thereof, it is not to be so limited as changes and modifications can be made therein which are deemed to come within the full intended scope of the invention, as defined by the appended claims.

What is claimed is:

1. In a magnetic amplifier tending to saturate in a terminal region of its operating range, said amplifier having an input circuit and a load circuit developing an output voltage generally proportional to the magnitude of a control signal applied to said input circuit, the combination therewith of a substantially purely resistive first positive-feedback path and a second positive-feedback path regeneratively connecting said load circuit to said input circuit, said first feedback path having a substantially linear impedance characteristic throughout said operating range, said second feedback path comprising non-linear impedance means substantially open-circuiting said second feedback path over part of said range and introducing a corrective positive feedback in said terminal region thereof for substantially compensating for deviations of the amplifier gain from a linear characteristic, said non-linear impedance means including a Zener diode reverse-connected in said second feedback path.

2. The combination defined in claim 8 wherein said non-linear impedance means further comprises a diode forwardly connected in said second impedance path in series with said Zener diode.

3. The combination defined in claim 2 wherein said further diode is also a Zener diode.

4. The combination defined in claim 1 wherein said first feedback path comprises a resistance shunted across said non-linear impedance means.

References Cited

UNITED STATES PATENTS 2,977,481 3/1961 Rosa ____________ 330—110 X

NATHAN KAUFMAN, *Primary Examiner.*

U.S. Cl. X.R.

330—110; 323—89